Feb. 2, 1960
H. Y. GROENEWEGEN
2,923,558
SAFETY GRIPS FOR USE IN VEHICLES
Filed Dec. 26, 1957
FIG: 1.
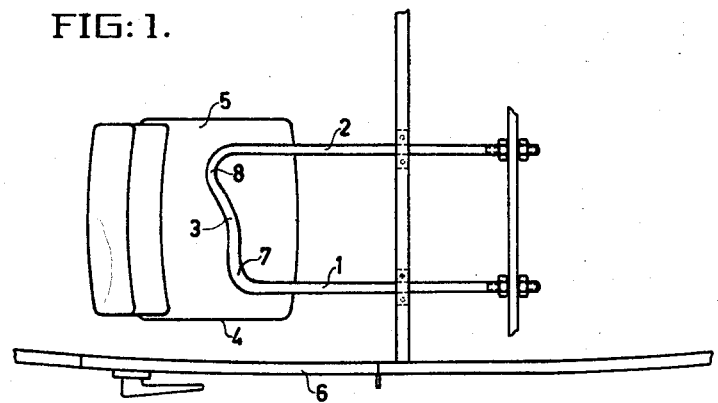
FIG: 2.
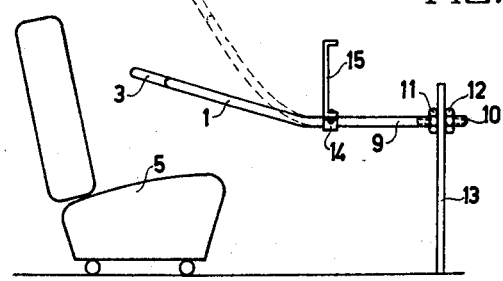
FIG: 3.
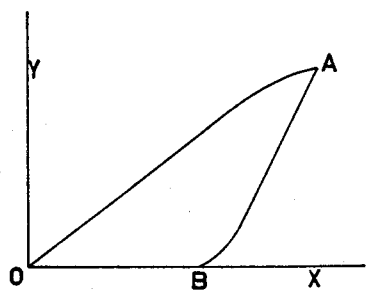
INVENTOR.
HERMANUS YSBRAND GROENEWEGEN (DECEASED)
BY EDUARD JOHAN SCHEPERS, ADMINISTRATOR
BY
Stevens, Davis, Miller & Mosher
ATTORNEYS

United States Patent Office 2,923,558
Patented Feb. 2, 1960

2,923,558

SAFETY GRIPS FOR USE IN VEHICLES

Hermanus Ysbrand Groenewegen, deceased, late of Hilversum, Netherlands, by Eduard Johan Schepers, legal representative, Laren, Netherlands, assignor to Algemene Kunstzijde Unie N.V., Arnhem, Netherlands, a company of the Netherlands Application December 26, 1957, Serial No. 705,396

Claims priority, application Netherlands
December 29, 1956

5 Claims. (Cl. 280—150)

The present invention relates to new and useful improvements in safety grips for vehicles to protect an occupant therein from being thrown forwardly against the windshield or other part of the vehicle by a sudden stopping thereof, such as by an excessive application of the brakes or as the result of a collision.

Safety grips of the type with which this invention is concerned are well known in the prior art. Some of the protective devices of the prior art have, generally, U-shaped configuration with leg portions sliding into telescoping units. Oftentimes, these telescoping units have resilient means which permit the cross-connecting end portion of the protecting device to extend in a forward manner towards the back of the vehicle's seat and which, by the resilient means, resists being compressed towards the front of the vehicle. This type of construction has a disadvantage since the stresses induced in the resilient means as a result of the compression thereof which, if strong enough, will have a deleterious effect upon the passenger who is thrown forward and then thrown backward by the compressed resilient means.

The safety grip of the present invention has a U-shaped configuration. The ends or leg portions thereof are mounted to the vehicle in a suitable manner. The cross-connecting portion or the base of the U is positioned to be approximately opposite the front lower torso region of a passenger of a motor vehicle. The material from which the safety grip is manufactured is a polymeric material which may be deformed to accommodate strains put thereon by a passenger.

An important object of the invention is to provide a body-bracing bar which is rigidly mounted under the instrument panel of a motor vehicle to protect an occupant of the front seat of the vehicle from being thrown forwardly and injured by striking the windshield or instrument panel.

Another object is to provide a safety grip in an automobile which is constructed of a material which has a relatively high strength coefficient and is capable of bending rather than breaking off.

A further object is to provide a device of this character of simple and practical construction, which is efficient and reliable in operation, strong and durable, relatively inexpensive to manufacture, and otherwise well adapted for the purpose for which the same is intended.

These objects, together with other objects and advantages which will become subsequently apparent, reside in the details of construction and operation as more fully hereinafter described and claimed, reference being had to the accompanying drawings forming a part hereof, wherein like numerals refer to like parts, throughout, and in which:

Figure 1 is a top view of the safety grip of the present invention in position.

Figure 2 is a side elevation of the safety grip of the present invention.

Figure 3 is a characteristic curve of the material of a safety grip according to the invention.

The safety grip shown in Figs. 1 and 2 has a U-shaped configuration which is made from polymeric materials such as polymeric caprolactum. The legs of said grip being designated by the numerals 1 and 2 while the cross-connecting portion between said legs is designated by the numeral 3. The cross-connecting portion 3 is suitably concave in order to receive the body in a smooth way and to check the body while being laterally pushed aside. At the side 4 of seat 5 adjoining the door 6 the portion 7 of said connecting portion 3 extends backward to the rear of seat 5 to an extent not as great as the portion 8 on the other side thus facilitating the ingress and egress of the passenger into the automobile. The curves arranged in the grip adjoining the portions 7 and 8, respectively, are formed for convenient points of support for the hands of the passenger.

The end portion of the leg 1 is designated as 9 and is provided with a screw thread 10 on which nuts 11 and 12 are screwed. The legs are mounted through motor partition 13 through suitably positioned holes. The leg portions are secured to the dashboard of the vehicle by means of saddles 14 which are connected to the bottom edge of instrument board 15. It will be appreciated that the leg 2 is mounted in the same manner as leg 1. It is possible, if desired, to pass legs 1 and 2 through suitably positioned holes in the instrument board by means of retaining rings which obviates the use of the saddles.

The materials which are suitable in manufacturing the safety grip of the present invention may be selected from a fairly wide range of plastics. Therefore, it is possible to employ such polymers as polyvinyl compounds; polyalkenes, such as polythene, and, particularly, irradiated polythene or low pressure polythene; polyesters, like polyethyleneterephtalate; cellulose esters, e.g., cellulose acetate or cellulose acetobutyrate. In so far the substances do not possess by nature the required retardation when resiliently moving backward after being deformed, they may gain said quality by adding thereto a larger or smaller amount of a plasticizer. In other words, what is desired from the material which is to be employed in manufacturing the safety grip of the present invention is a material which in case of a very elevated overloading permits a plastic deformation without breaking while in case of a considerable load the material will be deformed to a considerable extent but after the load has been removed, the deformation will substantially disappear with time.

A preferred substance which may be used in the manufacture of the safety grips of the present invention are the polyamides which already possess retardation characteristics with no plasticizer being necessary. The polyamides applicable may be prepared from diamines and dicarboxylic acids as well as those obtained from caprolactum.

The cross-section dimensions of the legs as well as the cross-section dimensions of the cross-connecting portion of the safety grip are determined with several factors in mind. These factors include the qualities of the material of which the safety grip is made: The length of the legs and the length of the cross-connecting portions and the means employed in order to securely fasten the safety grip to the vehicle. Also to be considered is the angle which the legs make with the horizontal plane.

Employing a safety grip consisting of a polyamide, it was discovered that the required effect could be obtained with the aid of a bar having a round cross-section and having a diameter of 25 mm. This bar was bent into a suitable U-shaped configuration. The length of the legs between the cross-connecting portion and the connecting points of the legs were about 60 cm. while, for the greater part of the length, the legs make an angle of 20° with the horizontal plane. Adjacent the connecting points, the legs were mounted in a horizontal plane. In order to further illustrate the use of a material which may be used in manufacturing the safety grip, reference is made to Figure 3. Referring to a bar made from the material, the displacement of which, after being bent, has been charted on the horizontal axis OX while the force causing said displacement has been charted on the vertical axis OY assuming an increasing force from zero to a given amount. The line from the orginal zero to the point A indicates the connection between the load and displacement. When at point A, the load disappears, the bar does not return to the original position designated by zero but runs along the line AB in the diagram. Not until after a considerable time does the displacement reduce itself practically to nothing again. Plastics of the polyamide type which have been obtained by polycondensation of caprolactum or of hexamethylenediamine and adipic acid have shown remarkable qualities when employed in the manufacture of safety grips. In such a case, the deforming energy accumulated in the material of the bar is to a considerable extent converted into heat, particularly, when a solid bar is employed. Therefore, the heat energy reflects in a less harmful way a system such as is employed when resilient means of the prior art is used.

In use in a vehicle which suddenly slackens speed, the passenger catches at the safety grip or is pressed against it. The safety grip will be under great bending strain, especially close to the points of mounting on the dashboard. The characteristic features of the material of which the safety grip is manufactured permits an extensive bending upwardly and forwardly. This bending forwardly and upwardly is shown by dotted lines in Figure 2. It will be appreciated that it is particularly important that the safety grip does not return to its original position immediately but rather returns to its position after a length of time. This feature, as was stated in the above, is due to the particular material employed.

The safety grip of the present invention has been described as a useful item in motor vehicles of the automobile type. It will be obvious that such a safety grip may be used in other types of transportation means, such as in airplanes or motorbuses. Furthermore, it will also be appreciated that the safety grip of the present invention may be suitably mounted to the rear of the forward seat so that passengers sitting in the rear seat may have the benefit of the use of safety grips.

From the foregoing, the construction and operation of the device will be readily understood. A further explanation is believed to be unnecessary. However, since numerous modifications and changes will readily occur to those skilled in the art, it is not desired to limit the invention to the exact instructions shown and described, and, accordingly, all suitable modifications and equivalents may be resorted to, for and within the scope of the appended claims.

What is claimed is:

1. A safety grip for use in vehicles comprising a substantially U-shaped member having opposing solid rod-like legs and a bight portion connecting adjoining ends of the legs and defining a hand hold, said legs having free ends, opposite to the bight portion, and mounted to suitable portions of the vehicle at a considerable distance from the bight portion, said legs being curved upwardly between their free ends and the bight portion and said member being constructed of a thermo-plastic material which in a case of very great overloading permits a plastic deformation without breaking while in case of less overloading, the material will be deformed to a considerable extent and, after the load has been removed will gradually return to its original position.

2. The safety grip according to claim 1 wherein the safety grip is constructed of a polymeric material which will assume its original shape after deformation.

3. The safety grip according to claim 1 wherein the safety grip is constructed of a polyamide.

4. The safety grip according to claim 1 wherein the corners connecting the cross-connecting portion to the legs are arcuate.

5. The safety grip according to claim 1 wherein the bight portion has a concave deflection in the direction of the legs the line of symmetry of said deflection and the longitudinal center line of said safety grip being set at an oblique angle to each other.

References Cited in the file of this patent

UNITED STATES PATENTS

| 1,619,697 | Brown | Mar. 1, 1927 |
| 1,841,954 | Jellineck | Jan. 19, 1932 |
| 2,039,503 | Tjaarda | May 5, 1936 |

FOREIGN PATENTS

| 880,862 | Germany | June 25, 1953 |
| 1,065,793 | France | Jan. 13, 1954 |
| 1,126,371 | France | July 23, 1956 |